US010273552B2

(12) United States Patent
Schulz et al.

(10) Patent No.: US 10,273,552 B2
(45) Date of Patent: Apr. 30, 2019

(54) ULTRAHIGH-STRENGTH MULTIPHASE STEEL WITH IMPROVED PROPERTIES DURING PRODUCTION AND PROCESSING

(71) Applicant: SALZGITTER FLACHSTAHL GMBH, Salzgitter (DE)

(72) Inventors: Thomas Schulz, Salzgitter (DE); Andreas Wedemeier, Braunschweig (DE); Wilfried Sprock, Braunschweig (DE); Volker Flaxa, Salzgitter (DE); Friedrich Luther, Hannover (DE); Ingwer Denks, Wolfenbüttel (DE); Sven Schulz, Lengede (DE)

(73) Assignee: SALZGITTER FLACHSTAHL GMBH, Salzgitter (DE)

( * ) Notice: Subject to any disclaimer, the term of this patent is extended or adjusted under 35 U.S.C. 154(b) by 909 days.

(21) Appl. No.: 14/375,381

(22) PCT Filed: Jan. 15, 2013

(86) PCT No.: PCT/DE2013/000041
§ 371 (c)(1),
(2) Date: Jul. 29, 2014

(87) PCT Pub. No.: WO2013/113304
PCT Pub. Date: Aug. 8, 2013

(65) Prior Publication Data
US 2015/0041024 A1   Feb. 12, 2015

(30) Foreign Application Priority Data

Jan. 30, 2012 (DE) .................... 10 2012 002 079

(51) Int. Cl.
*C21D 8/02* (2006.01)
*C22C 38/02* (2006.01)
(Continued)

(52) U.S. Cl.
CPC ......... *C21D 8/0252* (2013.01); *B62D 29/007* (2013.01); *C21D 1/20* (2013.01);
(Continued)

(58) Field of Classification Search
CPC .. C21D 8/0263; C21D 1/20; C21D 2211/002; C21D 2211/005; C21D 2211/008;
(Continued)

(56) References Cited

U.S. PATENT DOCUMENTS

2001/0015245 A1   8/2001  Eberle et al.
2003/0084966 A1*  5/2003  Ikeda ............... C21D 1/185
                                            148/320
(Continued)

FOREIGN PATENT DOCUMENTS

DE        10037867       7/2001
EP         0922777       6/1999
(Continued)

OTHER PUBLICATIONS

Theis, Henry E. "Flatteners, Levelers, and Tension Leveling." Handbook of Metalforming Processes. New York, NY: Marcel Dekker, 1999. 201.*
(Continued)

*Primary Examiner* — Colleen P Dunn
*Assistant Examiner* — Anthony M Liang
(74) *Attorney, Agent, or Firm* — Henry M. Feiereisen LLC

(57) ABSTRACT

In a process for producing a cold- or hot-rolled steel strip from an ultrahigh-strength multiphase steel having a particular composition the required multiphase microstructure is generated during continuous heat treatment. The cold- or hot-rolled steel strip is heated in the continuous heat treatment furnace to a temperature in the range from 700 to 950° C. and the heat-treated steel strip is subsequently cooled (Continued)

Figure 1:
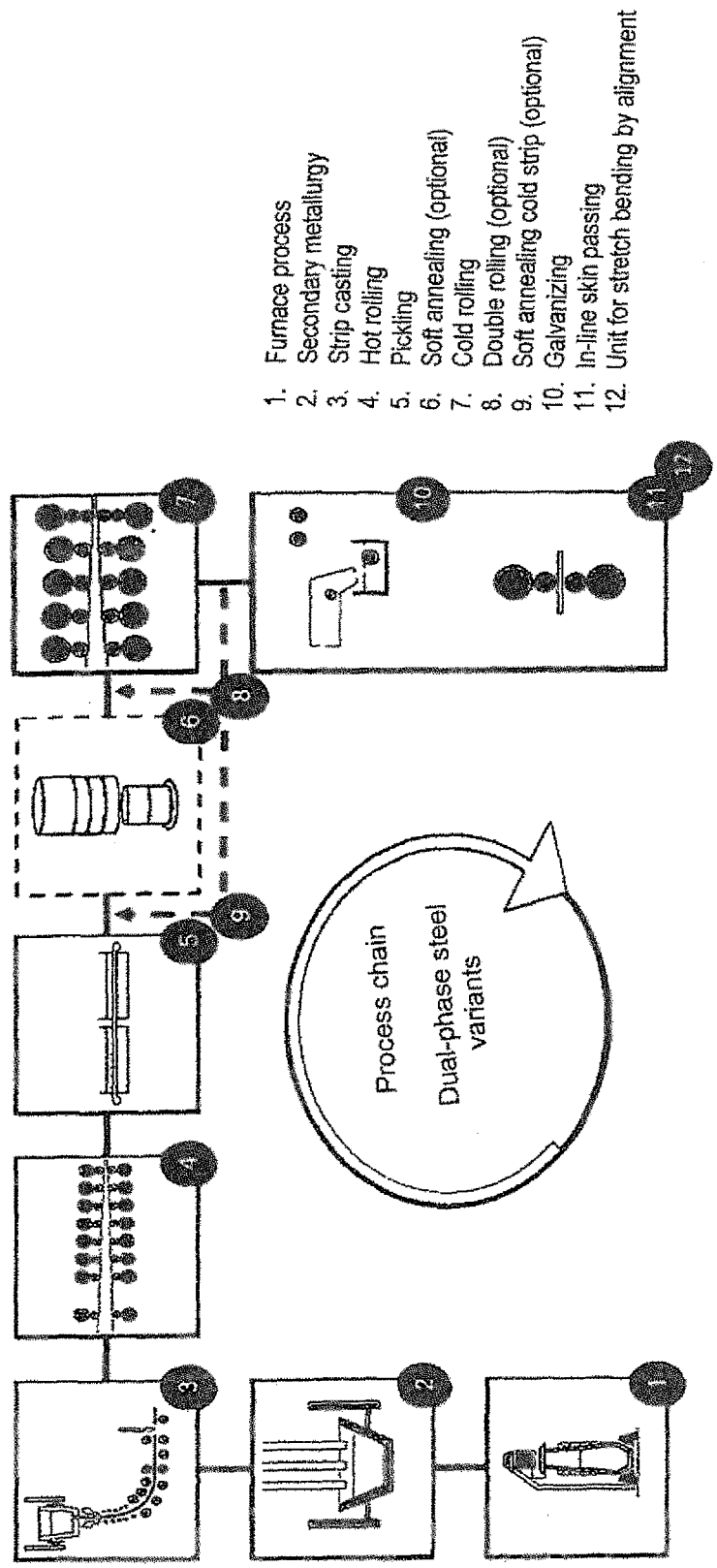

1. Furnace process
2. Secondary metallurgy
3. Strip casting
4. Hot rolling
5. Pickling
6. Soft annealing (optional)
7. Cold rolling
8. Double rolling (optional)
9. Soft annealing cold strip (optional)
10. Galvanizing
11. In-line skin passing
12. Unit for stretch bending by alignment from the heat treatment temperature at a cooling rate of from 15 to 100° C./s to a first intermediate temperature of from 300 to 500° C. followed by cooling at a cooling rate of from 15 to 100° C./s to a second intermediate temperature of from 200 to 250° C.; the steel strip is subsequently cooled at a cooling rate of from 2 to 30° C./s in air to room temperature or the cooling at a cooling rate of from 15 to 100° C./s is maintained from the first intermediate temperature to room temperature.

11 Claims, 7 Drawing Sheets

(51) Int. Cl.
| | | |
|---|---|---|
| C21D 9/00 | (2006.01) | |
| C21D 1/20 | (2006.01) | |
| C22C 38/00 | (2006.01) | |
| C22C 38/06 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/32 | (2006.01) | |
| C22C 38/38 | (2006.01) | |
| B62D 29/00 | (2006.01) | |

(52) U.S. Cl.
CPC ......... *C21D 8/0263* (2013.01); *C21D 8/0284* (2013.01); *C21D 9/0068* (2013.01); *C21D 9/0087* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C21D 2211/002* (2013.01); *C21D 2211/005* (2013.01); *C21D 2211/008* (2013.01)

(58) Field of Classification Search
CPC .. C21D 8/0252; C21D 8/0284; C21D 9/0068; C21D 9/0087; B62D 29/007; C22C 38/001; C22C 38/002; C22C 38/02; C22C 38/06; C22C 38/22; C22C 38/24; C22C 38/26; C22C 38/28; C22C 38/32; C22C 38/38

See application file for complete search history.

(56) References Cited

U.S. PATENT DOCUMENTS

| | | |
|---|---|---|
| 2009/0173412 A1 | 7/2009 | Schoettler et al. |
| 2010/0000634 A1 | 1/2010 | Spehr et al. |
| 2010/0273024 A1 | 10/2010 | Bocharova et al. |
| 2011/0024006 A1 | 2/2011 | Schoettler et al. |
| 2011/0220252 A1 | 9/2011 | Hammer et al. |
| 2012/0279677 A1 | 11/2012 | Spitzer et al. |
| 2012/0305139 A1 | 12/2012 | John et al. |

FOREIGN PATENT DOCUMENTS

| | | |
|---|---|---|
| EP | 2028282 | 2/2009 |
| EP | 2031081 | 3/2009 |

OTHER PUBLICATIONS

International Search Report issued by the European Patent Office in International Application PCT/DE2012/001133 dated Feb. 20, 2013.
Bleck W et al:"Microalloying of cold-formable multi phase steel grades", Materials Science Forum, Trans Tech Publications LTD—Switzerland, CH, vol. 500-501, Nov. 1, 2005(Nov. 1, 2005), pp. 97-112, XP008116657, ISSN:0255-5476 p. 101:"Alloying elements in TRIP steels".
Braun et al, U.S. Pat. No. 8,404,061, Mar. 26, 2013, 2012/0107632, May 3, 2012.
Kroos et al, U.S. Pat. No. 7,806,165, Oct. 5, 2010, 2007-0289717, Dec. 20, 2007.

* cited by examiner

| | C/%/ | Si/%/ | Mn/%/ | P/%/ | S | N/%/ | Al/%/ | Cr/%/ | Mo/%/ | Ti/%/ | V/%/ | Nb/%/ | B/%/ |
|---|---|---|---|---|---|---|---|---|---|---|---|---|---|
| Reference | 0.154 | 0.385 | 2.006 | 0.018 | 0.006 | 0.0048 | 0.052 | 0.372 | 0.213 | 0.004 | 0.005 | 0.033 | 0.0001 |
| Invention (laboratory test) | 0.097 | 0.365 | 1.946 | 0.017 | 0.003 | 0.0068 | 0.035 | 0.408 | 0.301 | 0.030 | 0.032 | 0.031 | 0.0031 |

Figure 2

Figure 3

| Transverse samples | Thickness/mm/ | Re/MPA/ | Rm/MPa/ | A80/%/ |
|---|---|---|---|---|
| Reference | 0.80 | 726 | 1091 | 11 |
| Reference | 1.35 | 612 | 1004 | 12 |
| Reference | 1.50 | 602 | 1020 | 12 |
| Invention (laboratory test) Process 1 | 0.90 | 630 | 1029 | 11 |
| Invention (laboratory test) Invention Process 1 | 1.35 | 625 | 1039 | 11 |
| Invention (laboratory test) Process 1 | 1.80 | 630 | 1032 | 12 |
| Invention (laboratory test) Process 2 | 1.35 | 674 | 1001 | 11 |

ZTU-Diagram with continuous cooling

Test conditions according to SEP 1680/81

Material type: multiphase steel     Short description: Invention

Melt:     Wafo:

Chemical composition (weight proportions in %): melt [ ] piece [x]

| C | Si | Mn | P | S | N | Al | Cu | Cr | Ni | Mo | Ti | V | Nb | Ca | B |
|---|----|----|---|---|---|----|----|----|----|----|----|---|----|----|---|
| 0.097 | 0.365 | 1.946 | 0.017 | 0.003 | 0.0047 | 0.035 | 0.051 | 0.408 | 0.064 | 0.301 | 0.030 | 0.032 | 0.03 | | 0.001 |

Work piece:
Sample retrieval:     Sample dimension: 5 x 10 mm
                      Hardness: HV 0.5

Austenizing     Measuring procedure     dilatometer

Heat duration: 30 s        $A_{c1}$: 708°C     $A_{c3}$: 902°C     $M_s$:
Temperature: 960 °C        $A_{c1b}$:          $A_{c1e}$:          $M_f$:
Holding time: 300 s        Austenite grain size:     after austenizing
                           According to DIN 50601

Cooling type:     linear [ ]     exponent. [x]

Fig. 5a (Legend ZT = intermediate temperature, RT = room temperature)

(Legend ST = melt bath temperature ZT = intermediate temperature, RT = room temperature)

(Legend ST = melt bath temperature ZT = intermediate temperature, RT = room temperature)

ULTRAHIGH-STRENGTH MULTIPHASE STEEL WITH IMPROVED PROPERTIES DURING PRODUCTION AND PROCESSING

CROSS-REFERENCES TO RELATED APPLICATIONS

This application is the U.S. National Stage of International Application No. PCT/DE2013/000041, filed Jan. 15, 2013, which designated the United States and has been published as International Publication No. WO 2013/113304 A2and which claims the priority of German Patent Application, Serial No. 10 2012 002 079.1, filed Jan. 30, 2012, pursuant to 35 U.S.C 119(a)-(d).

BACKGROUND OF THE INVENTION

The invention relates to an ultra high strength multiphase steel with dual-bainite-martensite- or complex-phase microstructure with improved properties during production and processing, in particular for the vehicle lightweight construction. The invention also relates to a method for producing steel strips made of such a steel.

The hotly contested automobile market forces manufacturers to constantly seek solutions to lower the fleet consumption while at the same time maintaining a highest possible comfort and occupant protection. Hereby weight saving of all vehicle components plays an important role but also a favorable behavior of the individual components in case of a high static or dynamic stress during use and also in case of a crash. Suppliers for starting material seek to account for this requirement by providing ultra-high-strength steel with thin sheet thickness to reduce the weight of the vehicle components while at the same time maintaining the same or even improved component properties.

Beside the required weight reduction these newly developed steels have to meet the high material demands regarding proof strength, tensile strength and elongation at break, as well as component demands regarding corner crack resistance, energy absorption and also have to have defined hardenings via the work-hardening effect and the bake-hardening effect. In addition good processability has to be ensured. This applies to the processes at the vehicle manufacturer (for example forming, welding or varnishing) as well as to the manufacturing processes at the supplier of starting material (for example surface treatment by metallic or organic coating).

The property combination demanded of the steel material in its consequence represents a component specific compromise of individual properties. In vehicle construction dual-phase steels are thus increasingly used which consist of a ferritic basic structure in which a martensitic second phase and possibly a further phase with bainite and residual austenite is integrated. The characteristic processing properties of the dual-phase steels such as a very low yield ultimate ratio at a very high tensile strength, strong strain hardening and good cold formability are well known.

Increasingly multiphase steels are also used in the automobile construction such as complex-phase steels, ferritic-bainitic steels, bainitic steels and also martensitic steels, which have different microstructure compositions.

Complex steels in hot rolled or cold rolled configuration are steels which have small proportions of martensite, residual austenite and/or perlite in a ferritic/bainitic basic structure, wherein as a result of a delayed recrystallization or precipitation of micro-alloy elements an extreme grain fineness is established.

Ferrite-bainitic steels in hot rolled configuration are steels, which contain bainite or work-hardened bainite in a matrix of ferrite and/or work-hardened ferrite. The work hardening of the matrix is caused by a high dislocation density, by grain refinement and the precipitation of micro-alloy elements.

Bainitic steels in hot rolled or cold rolled configuration are steels which are characterized by a very high yield strength and tensile strength at a sufficiently high expansion for cold forming processes. Due to the chemical composition a good weldability is given. The microstructure typically consists of bainite and ferrite. In some cases small proportions of other phases such as martensite and residual austenite can be contained.

Martensitic steels in hot rolled configuration are steels which as a result of thermo-mechanical rolling contain small proportions of ferrite and/or bainite in the basic structure of martensite. The steel type is characterized by a very high yield strength and tensile strength at a sufficiently high expansion for cold forming processes. Within the group of multiphase steels the martensitic steels have the highest tensile strength values.

These steels are also currently used in structural components, chassis and crash relevant components as well as flexibly cold rolled strips. This Tailor Rolled Blank lightweight construction technology (TRB®) enables a significant weight reduction as a result of the load adjusted selection of sheet thickness over the length of the component.

In the case of strongly varying sheet thicknesses, the production of TRB®s with multiphase microstructure is possible with todays known alloys and the available continuous annealing systems only with limitations such as regarding the heat treatment prior to the cold rolling. In regions of different sheet thickness no homogenous multiphase microstructure can be established in cold rolled and hot rolled steel strips due to the temperature difference in the conventional process windows.

For economic reasons cold rolled steel strips are usually subjected to recrystallizing annealing in the continuous annealing process to generate well formable steel sheet. Depending on the alloy composition and the strip cross section, the process parameters such as throughput speed, annealing temperature and cooling rate, are adjusted correspondingly to the mechanical-technological properties by way of the microstructure required therefore.

For establishing the dual-phase microstructure the hot strip or cold strip is heated in the continuous annealing furnace to such a temperature that the required microstructure forms during the cooling. The same applies for configuring a steel with complex phase microstructure, martensitic, ferritic-bainitic and also purely bainitic microstructure.

When high demands on corrosion protection require the surface of the hot or cold strip to be hot dip galvanized, the annealing is usually carried out in a continuous hot dip galvanizing system in which the heat treatment or annealing and the downstream galvanizing occur in a continuous process.

Also in case of the hot strip, depending in each case on the alloying concept, the demanded microstructure is only established in the annealing in the continuous furnace in order to realize the demanded mechanical properties.

The continuous annealing of hot rolled or cold rolled steel strip for example with the alloy concepts for ultra-high-strength dual-phase steels with minimal tensile strengths of about 950 MPa known from EP 2018 282 A1 and EP 2031 081 A1, involve the problem that only a small process window is available for the annealing parameters. As a result adjustments of the process parameters are already required at minimal cross sectional changes (thickness, width) to achieve uniform mechanical properties.

In the case of widened process windows the required strip properties can also be achieved at same process parameters also in the case of greater cross sectional changes of the strips to be annealed.

Besides flexibly rolled blanks with different sheet thicknesses over the strip width this applies in particular also to strips with different thickness and/or different width which have to be annealed subsequent to each other.

Especially in the case of different thicknesses in the transition region of one strip to another, a homogenous temperature distribution is difficult to achieve. In the case of alloy compositions with too small process windows this can lead to the fact that for example the thinner strip is either moved through the furnace too slowly thereby lowering productivity, or that the thicker strip is moved though the furnace too fast and the required annealing temperature for achieving the desired microstructure is not reached. The result of this is more waste with the corresponding non-conformity costs.

The deciding process parameter is thus the adjustment of the speed in the continuous annealing because the phase transformation is temperature and time dependent. Thus, the less sensitive the steel is regarding the uniformity of the mechanical properties when temperature and time course change during the continuous annealing, the greater is the process window.

The problem of a too narrow process window is especially pronounced in the annealing treatment when stress-optimized components made of hot or cold strip are to be produced, which have sheet thicknesses that vary across the strip length and strip width (for example as a result of flexible rolling).

A method for producing a steel strip with different thickness across the strip length is for example described in DE 100 37 867 A1.

When using the known alloy concepts for the group of the multiphase steels, the narrow process window makes it already difficult during the continuous annealing of strips with different thickness to establish uniform mechanical properties over the entire length of the strip. Complex-phase steels in addition have an even narrower process window than dual-phase steels.

In the case of flexibly rolled cold strip made of multiphase steels of known composition, the too narrow process window either causes the regions with lower sheet thickness to have excessive strengths resulting from excessive martensite proportions due to the transformation processes during the cooling, or the regions with greater sheet thickness achieve insufficient strengths as a result of insufficient martensite proportions. Homogenous mechanical-technological properties across the strip length or width can practically not be achieved with the known alloy concepts in the continuous annealing.

The goal to achieve the resulting mechanical-technological properties in a narrow region across the strip width and strip length by the controlled adjustment of the volume proportions of the microstructure phases has highest priority and is therefore only possible by a widened process window. The known alloy concepts for multiphase steels are characterized by a too narrow process window and are therefore not suited for solving the present problem, in particular in the case of flexibly rolled strips. With the known alloy concepts to date only steels of a strength class with defined cross sectional regions (sheet thickness and strip width) can be produced so that different alloy concepts are required for different strength classes or cross sectional ranges.

The state of the art is to increase the strength by increasing the amount of carbon and/or silicone and/or manganese and via the microstructure adjustment and the solid solution strengthening (solid solution hardening).

However, as a result of increasing the amount of the aforementioned elements, the material processing properties increasingly worsen for example during welding, forming and hot dip coating.

On the other hand, there is also a trend in the steel production to reduce the carbon and/or manganese content in order to achieve a better cold processability and better performance properties.

An example is the hole expansion test for describing and quantifying the edge crack behavior. At corresponding optimized grades the steel user expects higher values than in the standard material. However, increasingly the focus is also on the welding suitability characterized by the carbon equivalent.

The automobile industry increasingly demands steel grades which have to meet significantly different requirements regarding the yield strength depending on the application. This leads to steel developments with comparatively great yield strength at conventional tensile strength interval.

A low yield strength ratio (Re/Rm) is typical for a dual-phase steel and serves in particular for the formability in stretching and deep drawing processes.

A higher yield strength ratio (Re/Rm) as it is typical for complex-phase steels is also characterized by a resistance against edge cracks. This can be attributed to the smaller differences in the strengths of the individual microstructure components, which has a positive effect on a homogenous deformation in the region of the cutting edge.

The analytical landscape for achieving multiphase steels with minimal strengths of 950 MPa has become more diverse and shows very broad alloy ranges regarding the strength-promoting elements carbon, manganese, phosphorous, aluminum and chromium and/or molybdenum as well as regarding the addition of micro-alloys individually or in combination and regarding the material characterizing properties.

The spectrum regarding dimensions is broad and lies in the thickness range of 0.50 to 3.00 mm, wherein the range between 0.8 to 2.1 mm is relevant. Predominantly slit strip dimensions and also wide strips up to 1700 mm are used.

SUMMARY OF THE INVENTION

The invention is therefore based on the object to propose a new ally concept for an ultra-high-strength multiphase steel with which the process window for the continuous annealing of hot or cold strip can be widened so that beside strips with different cross sections also steel strips with a thickness which varies across the strip length and as the case may be strip width can be generated with mechanical-technological properties that are as homogenous as possible. In addition a method for producing a strip made of this steel is set forth.

According to the teaching of the invention, this object is solved by a steel with the following contents in weight %:

| | |
|---|---|
| C | 0.075 to ≤0.105 |
| Al | 0.005 to ≤0.060 |

-continued

| | |
|---|---|
| Si | 0.200 to ≤0.650 |
| Mn | 1.750 to ≤2.350 |
| P | ≤0.020 |
| S | ≤0.0050 |
| Cr | 0.200 to ≤0.500 |
| Mo | 0.200 to 0.500 |
| Ti | ≥0.005 to ≤0.060 |
| Nb | ≥0.005 to ≤0.060 |
| V | ≥0.005 to ≤0.060 |
| B | ≥0.0010 to ≤0.0060 |
| N | ≤0.0090 | remainder iron including usual steel accompanying elements not mentioned above. This steel is treated according to the method according to the characterizing portion of claim 1.

The steel defined by this analysis has the advantage of a significantly increased process window compared to the known steels. This results in an increased process reliability in the continuous annealing of cold and hot strip with multiphase microstructure. Thus more homogeneous mechanical-technological properties in the strip or in the transition region of two strips can be ensured for continuously annealed hot or cold strips also in the case of different cross sections and otherwise same process parameters.

This applies for the continuous annealing of subsequent strips with different strip cross sections as wells as for strips with varying sheet thickness and strip length or strip thickness. This for example enables a processing in selected thickness ranges such as a strip thickness of smaller than 1 mm, a strip thickness of 1 to 2 mm and a strip thickness of greater than 2 mm.

When high-strength, hot strips or cold strips made of multiphase steel with varying sheet thicknesses are produced according to the invention in the continuous annealing method, stress-optimized components can advantageously be produced by forming from this material. The produced material can be produced as cold strip and also as hot strip via a hot dip galvanizing line or a pure continuous annealing line in the skin passed or non skin passed state and also in the heat treated state (intermediate annealing) as well as in the stretched and non stretched state (aligning by stretch bending).

At the same time it is possible to adjust the microstructure components by varying the process parameters so that steels in different strength classes, for example with tensile strengths between 750 MPa and 1000 MPa, can be produced.

The steel strips produced with the alloy composition according to the invention are characterized during manufacture of a multiphase steel or bainitic steel by a significantly wider process window regarding the annealing temperature and throughput speed in the case of inter-critical annealing between $A_{C1}$ and $A_{C3}$ or in an austenitic annealing above $A_{C3}$ with final controlled cooling compared to the known alloy concepts.

Advantageous are annealing temperatures of 700° C. to 950° C. Depending on the overall process there are different approaches for realizing the heat treatment.

In the continuous heat treatment line without subsequent hot dip coating, the strip is cooled starting from the annealing temperature with a cooling rate of 15 to 100° C./s to an intermediate temperature of 200 to 250° C. Optimally, cooling to a previous intermediate temperature of 300 to 500° C. can occur beforehand with a cooling rate of 15 to 100° C./s.

In the heat treatment within the framework of a hot dip coating there are two possibilities of the temperature profile. The cooling as described above is halted before entry into the dip bath and is only continued after exit from the bath until reaching the intermediate temperature of 200 to 250° C. Depending on the dip bath temperature a holding temperature results hereby of 420 to 470° C. The cooling to room temperature occurs again with a cooling rate of 2 to 30° C./s.

The second variant of the temperature course in the hot dip coating includes the holding of the temperature for 1 to 20 s at the intermediate temperature of 200 to 250° C. and a subsequent reheating to the temperature of 420 to 470° C. required for the hot dip coating. After the hot dip coating the strip is cooled again to 200 to 250° C. The cooling to room temperature occurs again with a cooling rate of 2 to 30° C./s.

Achieving a wide process window is based on the combination according to the invention of the four micro-alloying elements titanium, niobium, vanadium and boron with addition of molybdenum at a total content of maximally 0.590% in order to not exceed the demanded strength class.

Titanium binds nitrogen, which is therefore no longer available for the formation of boron nitride which allows boron to realize its effect in the first place. In this case the addition of boron, which is present in free form, results in an increase of the hardenability. The addition of Nb further increases this effect.

Niobium as the most effective of all micro-alloying elements causes a significant strength increase through grain refinement among other things.

The strength increasing effect of vanadium is based almost solely on the precipitation hardening. Advantageous are the high solubility in the austenite and the great volume proportion of fine precipitations caused by the low precipitation temperature.

While there is some debate in the literature regarding the influence of boron on the excessive hardening, the enormous potential of boron regarding the hardness penetration is uncontested. The microstructure becomes more isotropic because differences in the cooling rates, which result from the process control or the geometry of the strip, have a smaller influence which also leads to a greater process window. The free boron is capable of generating a relatively homogenous microstructure (same microstructure proportions) across the sheet thickness. The same also applies to the less pronounced influence of temperature gradients which occur across the length of the strip or with regard to its width.

The addition of molybdenum improves the hardenability. The perlite and bainite transformation are shifted toward longer time periods and the martensite temperature is lowered.

In classical dual-phase steels beside manganese, chromium and silicone in particular also carbon is important for the properties and distribution of the martensite. Addition of a small amount of boron substitutes for a relatively high proportion of carbon. This also has a positive effect on the microstructure because carbon is one of the strongest segregating elements in the steel. As a result segregations, which locally lead to different thermodynamic driving forces regarding the phase generation, are less pronounced, thereby in turn achieving a higher robustness compared to process or geometry related temperature fluctuations.

The stated micro-alloying elements realize their effect in different process stages. The addition of titanium and niobium, in particular in combination with boron, shifts the ferrite region toward significantly later time points during the cooling so that the formation of ferrite is often no longer possible in the process typical times. As a result microstructures are established with high bainitic proportions to which the potential for complex phase steels and bainitic steels is attributable.

The carbide and nitride formation of vanadium only occurs at temperatures around 1000° C. or still after the γ/α transformation, i.e., significantly later than in the case of titanium and niobium. Vanadium has thus hardly a grain refining effect due to the low number of precipitations present in the austenite. Also the austenite grain growth is not inhibited by the late precipitation of the vanadium carbides. Thus the strength increasing effect is based almost solely on the precipitation hardening.

The proportions of ferrite are thereby more or less strongly reduced by increased proportions of bainite depending on the process parameters. The combination of the four micro-alloying elements with molybdenum enables the material variety described above.

Tests have shown that the combination of the micro-alloying elements niobium, titanium and boron is not sufficient by itself to achieve a wide process window and the typically demanded tensile strength range of at least 950 MPa for hot strip and at least 980 MPa for cold re-rolled hot strip and cold strip. This was only possible by additionally adding vanadium and molybdenum in the stated contents.

The setting of a low carbon content of ≤% 0.105 allows reducing the carbon equivalent which improves the weldability and also allows avoiding excessive hardening during welding. In the case of resistance spot welding the electrode service life can also be significantly increased.

In the following the effect of the elements on the alloy according to the invention is described in more detail. The multiphase steels typically have a chemical composition in which alloy components are combined with and without micro-alloying elements. Accompanying elements are unavoidable and are taken into account regarding their effect when necessary.

Accompanying elements are elements, which are already present in the iron ore or enter the steel due to manufacturing. Due to their predominantly negative effect they are usually undesired. It is sought to remove them to a tolerable content or to convert them into less deleterious forms.

Hydrogen (H) is the only element which can diffuse through the iron lattice without generating lattice tensions. As a result hydrogen is relatively mobile in the iron lattice and can be taken up relatively easily during manufacturing. Hydrogen can thereby only be taken up into the iron lattice in atomic (ionic) form.

Hydrogen has a strong embritlling effect and diffuse preferably to energetically favorable sites (defects, grain boundaries etc). Thereby the defects act as hydrogen traps and can significantly increase the retention time of the hydrogen in the material.

As a result of the combination to molecular hydrogen cold cracks an be generated. This behavior occurs in the hydrogen embrittlement or in hydrogen induced stress corrosion. Also in the so-called delayed fracture, which occurs without external tensions, hydrogen is often named as the cause.

Therefore the hydrogen content in the steel should be as low as possible.

Oxygen (O): in the molten state steel has a relatively great capacity for absorbing gases, however, at room temperature oxygen is only soluble in very low amounts. Analogous to hydrogen, oxygen can only diffuse into the material in atomic form. Due to the strongly embrittling effect and the negative effect on the ageing resistance, oxygen content is sought to be reduced during production as much as possible.

For reducing the oxygen, on one hand production methods such as a vacuum treatment, and on the other hand analytical approaches exist. By adding certain alloy elements oxygen can be converted into harmless states. Thus binding of oxygen via manganese, silicone and/or aluminum is common. However the oxide produced thereby can cause negative properties in the material in the form of defects. On the other hand a fine precipitation of aluminum oxides can lead to a grain refinement.

For the foregoing reasons the oxygen content in the steel should be as low as possible.

Nitrogen (N) is also an accompanying element in the steel production. Steels with fine nitrogen are prone to a strong ageing effect. Nitrogen already diffuses at low temperatures at dislocations and blocks the same. As a result it causes a strength increase associated with a fast loss o tenacity. Binding of nitrogen in the form of nitrides is possible by adding aluminum or titanium.

For the foregoing reasons nitrogen content is limited to ≤0.0090%. advantageously to ≤0.0080% or optimally to ≤0.0070% or to unavoidable amounts during steel production.

Sulfur (S) like phosphorous is bound as trace element in the iron ore. It is undesired in the steel (exception automate steels) because of its excessive tendency for segregation and embrittling effect. It is therefore sought to achieve as low amounts of sulfur as possible in the metal (for example by a deep vacuum treatment). Further the present sulfur is converted into the relatively harmless compound manganese sulfide (MnS).

The manganese sulfides are often rolled out band-like during rolling and function as germination sites for the transformation. Especially in the case of diffusion controlled transformation this leads to a microstructure that is configured band-like and can lead to decreased mechanical properties in the case of strongly pronounced banding (for example pronounced martensite bands instead of distributed martensite islands, anisotropic material behavior, reduced braking elongation).

For the foregoing reasons the sulfur content is limited to ≤0.0050% or to unavoidable amounts during steel production.

Phosphorous (P) is a trace element from the iron ore and is solubilized in the iron lattice as substitution atom. As a result of the solid solution strengthening phosphorous increases the strength and improves the hardenability.

However, it is usually sought to lower the phosphorous content as far as possible because among other things due to its slow diffusion speed it has a strong tendency to segregation and strongly lowers the tenacity. Deposition of phosphorus at the grain boundaries can lead to grain boundary cracks. In addition phosphorous increases the transition temperature from tenacious to brittle behavior by up to 300° C. During hot rolling, surface-proximate phosphorous oxides can lead to separation at the grain boundaries. The negative effects of phosphorous can be partly compensated by adding small amounts of boron. It is suspected that boron increases the grain boundary cohesion and lowers the phosphorous segregation a eth grain borders.

However, due to the lows costs and the high strength increase phosphorous is used in some steels in low amounts (<0.1%) as micro-alloying element. For example in high strength steels (interstitial free) or also in some alloying concepts for dual-phase steels.

For the aforementioned reasons phosphorous is limited to ≤0.020% or to unavoidable amounts during steel production.

Alloying elements are usually added to the steel in order to influence properties in a targeted manner. Hereby an alloying element can influence different properties in different steels. The effect generally depends strongly on the amount and the solubility state in the material.

Thus chromium can on one hand in soluble form already in small amounts significantly increase the hardenability of steel. On the other hand chromium causes at corresponding temperature profiles in form of chromium carbides a particle hardening. The increase of the number of germination sites associated therewith at simultaneously lowered content of carbon leads to a lowering of the hardenability.

The interrelations can thus be very diverse and complex. In the following the effect of the alloying elements is described in more detail.

Carbon (C) counts as the most important alloy element in the steel. As a result of its targeted introduction to up to 2.06% iron is caused to become steel in the first place. Oftentimes the carbon content is drastically lowered during steel production. In dual-phase steels for a continuous hot dip coating its content is maximally 0.23%, a minimal value is not given.

Carbon is dissolved interstitially in the iron lattice due to its relatively small atomic radius. The solubility in the $\alpha$-iron is maximally 0.02% and in the $\gamma$-iron maximally 2.06%. In solubilized form carbon increases the hardenability of steel significantly.

As a result of the different solubility, pronounced diffusion processes are necessary in the phase transformation which can lead to very different kinetic conditions. In addition carbon increases the thermodynamic stability of the austenite which becomes apparent in the phase diagram as a widening of the austenite region toward lower temperatures. With increasing force-solubilized carbon content in the martensite the lattice distortions increase and associated with this the strength of the non-diffusively generated phase.

In addition carbon is required for the formation of carbides. A representative is zementite ($Fe_3C$), which is present in almost every steel. However, significantly harder special carbides can form with other metals such as chromium, titanium, niobium and vanadium. Not only the type but also the distribution and size of the precipitations is of deciding importance for the resulting strength increase. In order to ensure a sufficient strength on one hand and a good weldability on the other hand, the minimal C-content is set to 0.075% and the maximal C-content to 0.105%.

Silicone (Si) binds oxygen during casting and thus lowers segregation and contaminations in the steel. In addition as a result of solid solution hardening silicone increases the strength and the yield strength ratio of the ferrite at only slightly lowered elongation at break. A further important effect is that silicone shifts the formation of ferrite to shorter times and thus enables the generation of sufficient amounts of ferrite prior to the quenching. As a result of the ferrite formation the austenite is enriched with carbon and is stabilized. At higher contents silicone stabilizes the austenite in the lower temperature range especially in the region of the bainite formation by preventing of carbide formation.

During the hot rolling a strongly adhering scale can form at high silicone contents, which can negatively affect the further processing.

In the continuous galvanizing silicone can diffuse during the annealing to the surface and by itself or together with manganese form film-like oxides. These oxides adversely affect the galvanization by impairing the galvanization reaction (solubilization of iron and formation of inhibition layer) during dipping of the steel strip into the zinc melt. This manifests itself in a poor zinc adhesion and un galvanized regions. By suitably operating the furnace with adjusted humidity in the annealing gas and/or by a low Si/Mn ratio and/or by using moderate amounts of silicone however, a good galvanization of the steel strip and a good zinc adhesion can be ensured.

For the aforementioned reasons the minimal Si-content is set to 0.200% and the maximal Si-content to 0.650%.

Manganese (Mn) is added to almost every steel for de sulfurization in order to convert the deleterious sulfur into manganese sulfides. In addition as a result of solid solution strengthening, manganese increases the strength of the ferrite and shifts the a/g transformation toward lower temperatures.

A main reason for adding manganese in dual-phase steel is the significant improvement of the hardness penetration. Due to the diffusion impairment the perlite and bainite transformation is shifted toward longer times and the martensite start temperature is lowered.

Like silicone, manganese tends to form oxides on the steel surface during the annealing treatment. Depending on the annealing parameters and the content of other alloy elements (in particular Si and Al), manganese oxides (for example MnO) and/or Mn mixed oxides (for example $Mn_2SiO_4$) can occur. However, manganese is less critical at a low Si/Mn or Al/Mn ratio because rather globular oxides instead of oxide films form. Nevertheless high manganese contents may negatively influence the zinc layer and the zinc hafting.

The Mn-content is therefore set to 1.750 to 2.350%.

Chromium (Cr): in dual-phase steels the addition of chromium mainly improves the hardness penetration. In the solubilized form chromium shifts the perlite and bainite transformation toward longer times and thereby at the same time lowers the martensite start temperature.

A further important effect is that chromium significantly increases the tempering resistance so that almost no strength losses occur in the zinc dip bath.

In addition chromium is a carbide former. When chromium is present in the carbide form the austenizing temperature has to be selected high enough prior to the hardening in order to solubilize the chromium carbides. Otherwise the increased number of nuclei may lead to an impairment of the hardness penetration.

Chromium also tends to form oxides on the steel surface during the annealing treatment, which may negatively affect the galvanization quality.

The Cr content is therefore set to values of 0.200 to 0.500%.

Molybdenum (Mo): similar to chromium, molybdenum is added for improving the hardenability. The perlite and bainite transformation is shifted toward longer times and the martensite start temperature is lowered.

Molybdenum also significantly increases the tempering resistance so that no strength losses are to be expected in the zinc bath and causes an increase in strength of the ferrite as a result of solid solution strengthening.

The amount of added Mo depends on the dimension, the system configuration and the microstructure configuration, wherein then the minimal content should be 0.200% in order to achieve an effect. For reasons of cost the Mo content is set to maximally 0.500% or optimally to $\geq 0.250\%$ and $\leq 0.450\%$.

Copper (Cu): the addition of copper can increase the tensile strength and the hardness penetration. In connection with nickel, chromium and phosphorous copper can form a protective oxide layer on the surface which significantly reduces the corrosion rate.

In connection with oxygen copper can form deleterious oxides at the grain boundaries, which can have negative consequences in particular for hot forming processes. The content of copper is therefore limited to amounts that are unavoidable during steel production.

The contents of other alloy elements such as nickel (Ni) or tin (Sn) are limited to amounts that are unavoidable during the steel production.

Micro-alloying elements are usually only added in very low amounts (<0.1%). In contrast to the alloying elements they are effective mainly through forming precipitations however they can also influence the properties in the solubilized state. In spite of the low added amounts, the micro-alloying elements strongly influence the production conditions such as processing and final properties.

Commonly used micro-alloying elements are carbide and nitride formers that are soluble in the iron lattice. A formation of carbonitrides is also possible due to the complete solubility of nitrides and carbides in each other. The tendency to form oxides and sulfides is usually most pronounced in the micro-alloying elements however it is usually prevented in a targeted manner due to other alloying elements.

This property can be used advantageously in that the generally deleterious elements sulfur and oxygen can be bound. However, the binding can also have negative consequences when it results in the fact that sufficient amounts of micro alloying elements are no longer available for the formation of carbides.

Typical micro-alloying elements are aluminum, vanadium, titanium and boron. These elements can be solubilized in the iron lattice and together with carbon and nitrogen form carbides and nitrides.

Aluminum (Al) is usually added to the steel in order to bind oxygen and nitrogen solubilized in the iron. In this way, oxygen is converted into aluminum oxides and aluminum nitrides. These precipitations can cause a grain refinement via increasing the nucleation sites and thus increase the tenacity and strength values.

Aluminum nitride is not precipitated when titanium is present in sufficient amounts. Titanium nitrides have a lower formation enthalpy and are formed at higher temperatures.

In the solubilized state aluminum, like silicone, shifts the ferrite formation toward shorter times and thus enables the formation of sufficient amounts of ferrite in the dual-phase steel. In addition it suppresses the carbide formation and leads thus to a delayed transformation of the austenite. For this reason Al is also used as alloy element in residual austenite steels in order to substitute for a portion of the silicone by aluminum. The reason for this approach is that Al is less critical for the galvanization reaction than Si.

The Al-content is therefore limited to 0.005 to maximally 0.060%.

Titanium (Ti) forms very stable nitrides (TiN) and Sulfides ($TiS_2$) already at high temperatures. These become solubilized in dependence on the nitrogen content in some cases only in the melt. When the thus generated precipitations are not removed together with the slag they form coarse particles in the material as a result of the high formation temperature, which are usually not beneficial for the mechanical properties.

A positive effect on the tenacity is generated by the bonding of the free nitrogen and oxygen. In this way titanium protects other solubilized micro-alloying elements such as niobium from being bound by nitrogen. These can then optimally exert their effect. Nitrides which only form at low temperature as a result of lowering the oxygen and nitrogen content can in addition cause an effective retardation of the austenite grain growth.

Not bound titanium forms titanium carbides at temperatures of 1150° C. and can in this way cause a grain refinement (inhibition of austenite grain growth, grain refinement by delayed recrystallization and/or increase of the nucleation sites at α/γ transformation) and a precipitation hardening.

The titanium content has therefore values of ≥0.005 and ≤0.060%. advantageously for cost reasons titanium is limited to contents of ≥0.025 and ≤0.045%.

Niobium (Nb) causes a strong grain refinement because it is most effective among all micro-alloying elements in delaying the recrystallization and in addition inhibits the austenite grain growth.

The strength increasing effect is qualitatively higher than that of titanium, manifested by the increased grain refining effect and the greater number of strength increasing particles (binding of the titanium to TiN at high temperatures). Niobium carbides form at temperatures below 1200° C. In the case of binding of nitrogen with titanium, niobium can increase its strength increasing effect by forming small and effective carbides in the lower temperature range (smaller carbide sizes).

A further effect of niobium is the delay of the α/γ-transformation and the lowering of the martensite start temperature in the solubilized state. On one hand this occurs by solute drag effect and on the other hand by grain refinement. The latter causes a strength increase of the microstructure and with this also a higher resistance against the volume increase during martensite formation.

In principle the addition of niobium is limited by its solubility limit. The latter limits the amount of precipitations, however, causes in particular the formation of early precipitations with relatively large particles when exceeded.

The precipitation hardening can thus in particular be effective in steels with low C-contents (greater oversaturation possible) and in hot forming processes (deformation induced precipitation).

The niobium content is therefore limited to values of ≥0.005 to ≤0.06% wherein for cost reasons the Nb content advantageously lies at ≥ and ≤0.045%.

Vanadium (V): the carbide and also the nitride formation of vanadium only starts at temperatures above 1000° C. or even after the α/γ-transformation, i.e., significantly later than in the case of titanium and niobium. Vanadium thus has hardly a grain refining effect due to the lower number of precipitations present in the austenite. Also the austenite grain growth is not inhibited due to the only late precipitation of the vanadium carbides.

Thus the strength increasing effect is based almost solely on the precipitation hardening. An advantage of vanadium is the high solubility in the austenite and the great volume proportion of fine precipitations caused by the low precipitation temperature.

The V-content is therefore limited to values from ≥0.005 to ≤0.060% wherein for cost reasons the V-content is advantageously ≥0.015 and ≤0.045%.

Boron (B) together with nitrogen and also with carbon forms nitrides and carbides; however this is usually not desired. On one hand only a small amount of precipitations forms due to the low solubility and on the other hand these are mostly precipitated at the grain boundaries. A strength increase on the surface is not achieved (exception boroding with formation of FeB and $Fe_2B$ in the border region of a work piece).

In order to prevent nitride formation it is usually sought to bind the nitrogen by more affine elements. In particular titanium can thereby ensure binding of the entire nitrogen. In the solubilized state boron leads in very small amounts to a significant improvement of the hardness penetration.

The mechanism of action of boron can be described in that, given an appropriate temperature profile, boron atoms become located at the grain boundaries where they significantly impair the formation of growth-capable ferrite nuclei by lowering the grain boundary energy. In the temperature profile care has to be taken that boron is predominantly distributed in atomic form in the grain boundary and is not present in the form of precipitations due to excessive temperatures.

The effectiveness of boron is decreased with increasing grain size and increasing carbon content (>0.8%). An amount of over 60 ppm in addition causes a lower hardenablility because boron carbides function as nucleation centers at the grain boundaries.

Due to its small atomic diameter boron diffuses exceptionally well and has a very a high affinity to oxygen which can lead to a lowering of the boron content in regions close to the surface (up to 0.5 mm). In this context annealing above 1000° C. is not advised. This is also advisable because boron can lead to a strong coarse grain formation at annealing temperatures above 1000° C.

Boron is an extremely critical element for the process of the continuous hot dip coating with zinc, because already at the lowest amounts by itself or together with manganese it can form film like oxides during the annealing on the steel surface. These oxides passivate the strip surface and prevent the galvanization reaction (iron solubilization and formation of an inhibition layer). Whether film-like oxides form depends on the amount of the free boron and manganese as well as on the used annealing parameters (for example humidity in the annealing gas, annealing temperature and annealing time). Higher manganese contents and long annealing times tend to lead to globular and less critical oxides. As a result of an increased humidity in the annealing gas it is also possible to reduce the amount of boron containing oxides on the steel surface.

For the aforementioned reasons the B-content is limited to values of ≥0.0010 to ≤0.0060%, wherein for the strength the advantageous content is at ≥0.0010 and ≤0.0050%.

Laboratory tests have shown that a complex phase steel with a minimal tensile strength of 950 MPa can be achieved by austenizing annealing of a hot strip above $A_{C3}$.

With an inter-critical annealing between $A_{C1}$ and $A_{C3}$ or an austenizing annealing above $A_{C3}$ with final controlled cooling a multiphase steel strip with a thickness of 1 and 3 mm was produced which is characterized by a greater tolerance against process fluctuations and has very uniform properties at constant process parameters.

With this a significantly widened process window is present for the alloy composition according to the invention compared to known alloy concepts.

The annealing temperatures for the steel according to the invention lie between 700 and 950° C., with this a partial austenitic microstructure (dual-phase region) or a fully austenitic microstructure (austenite region) is achieved during the annealing, depending on the microstructure to be achieved in the steel strip (complex phase microstructure).

The tests show that the established microstructure proportions after an inter-critical annealing between $A_{C1}$ and $A_{C3}$ or the austenizing annealing above $A_{C3}$ with subsequent controlled cooling are maintained also after a further process step (hot dip coating at temperatures between 420 to 470° C. for example in the case of Z (zinc) and ZM (zinc-magnesium).

The hot dip coated material can be manufactured as hot strip as well as cold re rolled hot strip or cold strip in the skin passed rolled (cold re-rolled) or non skin pass rolled state and/or stretch leveled or not stretch leveled state.

Steel strips, in the present case as hot strips, cold re rolled hot strip or cold strip made from the alloy composition according to the invention are characterized in addition during the further processing by a high resistance against edge proximate crack formation.

In addition, as a result of a quasi isotropy of the steel strip, the material can advantageously also be used transversely, longitudinally and diagonally relative to the tolling direction.

In order to ensure the cold rollability of a hot strip produced from the steel according to the invention the hot strip is according to the invention produced with final rolling temperatures in the austenitic range above $A_{C3}$ and coiling temperature above the recrystallization temperature.

Figure 4:
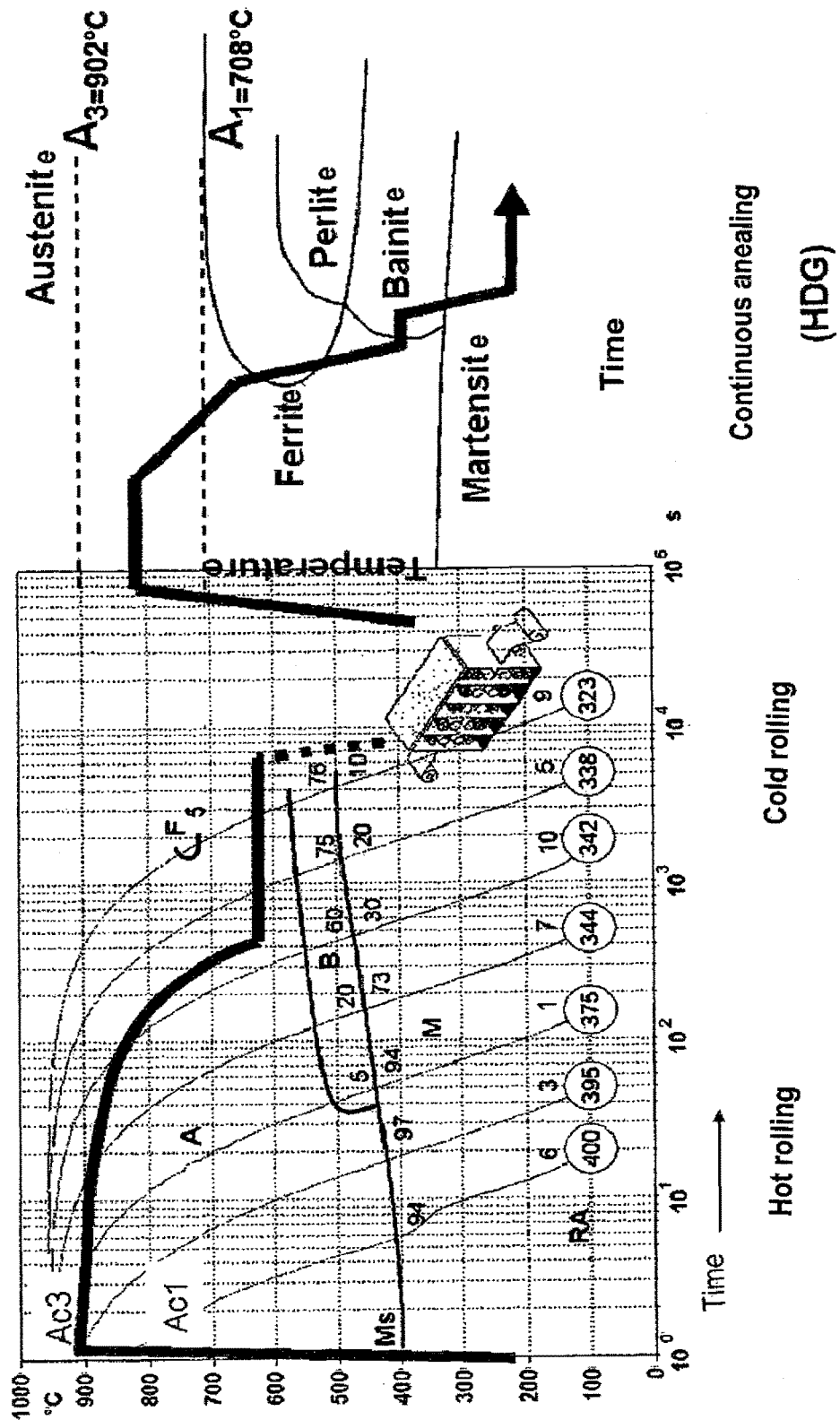
Figure 5B:
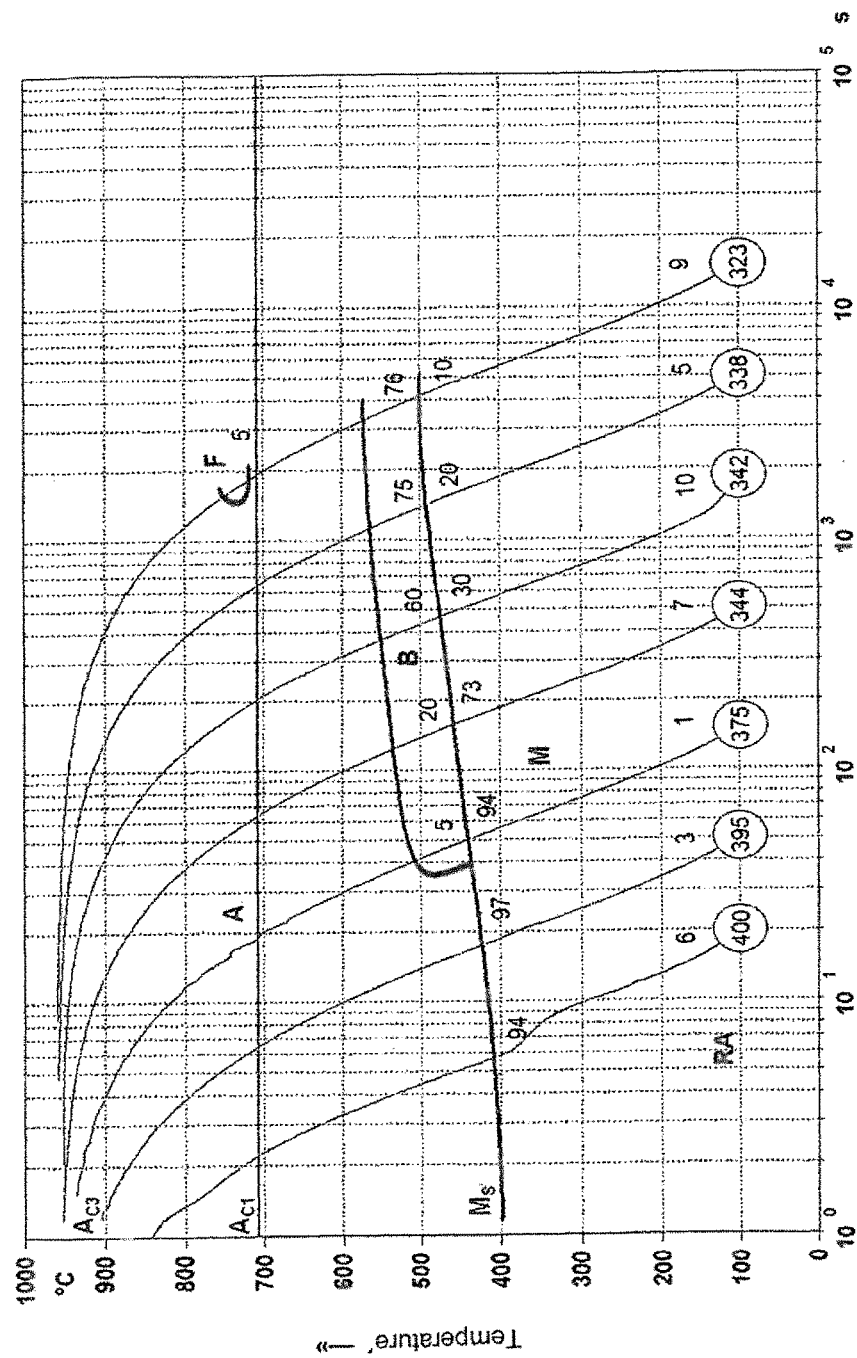
Figures 6A, 6B:
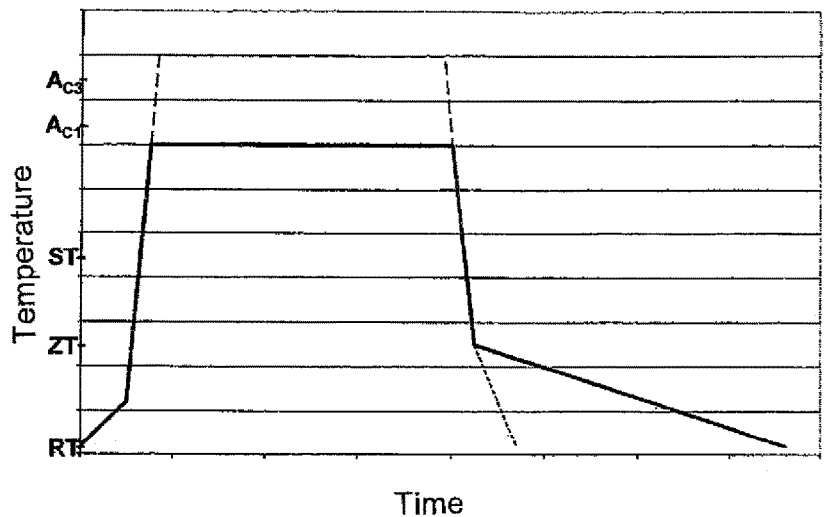
Figure 6C:
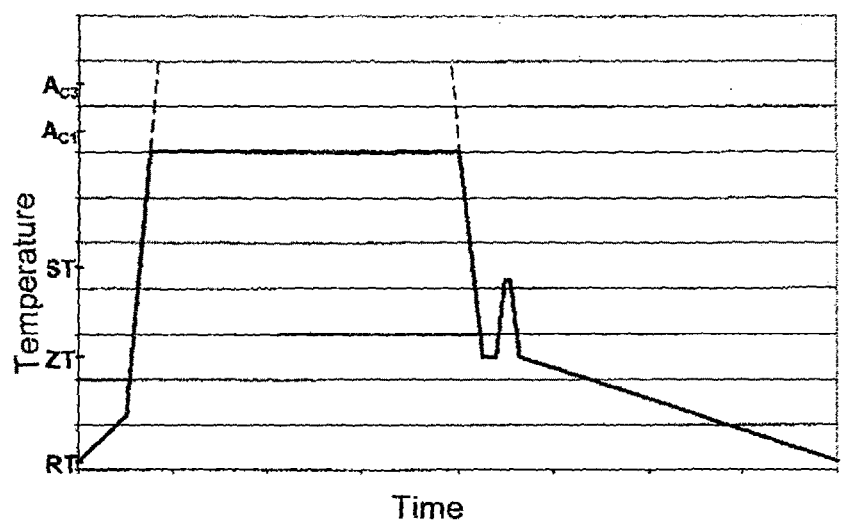

Further features, advantages and details of the invention will become apparent from the following description of exemplary embodiments shown in the drawing. It is shown in:

FIG. 1 schematically the process chain for the production of the steel according to the invention FIG. 2: analytical comparison FIG. 3: technological comparison FIG. 4: schematic time-temperature course of the process steps hot rolling and continuous annealing FIG. 5a: test conditions for a ZTU-diagram of FIG. 5b for a steel according to the invention FIG. 5b: ZTU-diagram for a steel according to the invention FIG. 6: temperature time curve (schematically).

FIG. 1 schematically shows the process chain for the production of the steel according to the invention. Shown are the different process routes relating to the invention. Up to position 5 (pickling) the process route is the same for all steels according to the invention, subsequent thereto different process routes are taken depending on the desired results. For example the pickled hot strip can be galvanized or cold rolled and galvanized. Or it can be soft annealed cold rolled and galvanized.

FIG. 2 shows the relevant alloy elements of the steel according to the invention compared to a steel of the same delivery grade corresponding to the state of the art (reference).

FIG. 3 shows the mechanical characteristic values of the steel according to the invention compared to a steel of the same delivery grade which corresponds to the state of the art (reference). All characteristic values correspond to the normative specification. It can be seen that the steel according to the invention has more homogenous characteristic values than the reference steels without adjusting the heat treatment parameters, even though the thickness difference of the produced sheets is greater in the steel according to the invention then in the reference steels. This is a sign of the widening of the process window.

FIG. 4 schematically shows the time temperature course of the process steps hot rolling and continuous annealing of strips made from the alloy composition according to the invention. Shown is the time and temperature dependent transformation for the rolling process as well as for a heat treatment after the cold rolling. Of particular interest is the shift of the ferrite transformation to later times. As a result thereof the potential of the complex phase steels and bainitic steels is made possible.

FIG. 5a shows test conditions for a ZTU diagram shown in FIG. 5b for a steel according to the invention. FIG. 5b shows a ZTU diagram for a steel according to the invention. Herein the determined ZTU diagram with the corresponding chemical composition and the $A_{C1}$ and $A_{C3}$ temperature is shown. By establishing corresponding temperature time courses during the cooling a wide spectrum of microstructure compositions can advantageously be established in the steel material.

FIG. 6 shows schematically the temperature time courses during the annealing treatment and cooling with three different variants and respective austenizing conditions corresponding to the applied for claims of the method.

The variant 1 (FIG. 6) shows the annealing and cooling of produced cold or hot rolled steel strip an a continuous annealing system. First, the strip is heat to a temperature in the range of 700 to 950° C. the annealed steel strip is then cooled from the annealing temperature with a cooling rate between 15 and 100° C./s to an intermediate temperature of 200° C. to 250° C. A second intermediate temperature (300 to 500° C.) is not shown in this schematic representation. Subsequently the steel strip is cooled at air with a cooling rate between 2 and 30° C./s until reaching room temperature or the cooling with a cooling rate between 15 and 100° C./s is maintained until reaching room temperature.

The variant 2 (FIG. 6b) shows the process according to variant 1, however the cooling of the steel strip is briefly interrupted during passage of the hot dip container for the purpose of a hot dip coating, in order to subsequently continue the cooling with a cooling rate between 15 and 100° C. to an intermediate temperature of 200 C to 250° C. Subsequently the steel strip is cooled at air with a cooling rate between 2 and 30° C. until reaching room temperature.

Variant 3 (FIG. 6c) shows also the process according to variant 1 in a hot dip coating, however the cooling of the steel strip is interrupted by a brief pause (1 to 20 s) at an intermediate temperature in the range from 200° C. to 250° C. is reheated to the temperature which is required for the hot dip coating (about 420° C.-470° C.). Subsequently the steel strip is cooled again to an intermediate temperature of 200° C. to 250° C. The steel strip is cooled at air with a final cooling at a cooling rate of 2 to 30° C. until reaching room temperature.

What is claimed is:

1. A method for producing a cold or hot rolled steel strip from a multiphase steel formed by a processing of the steel strip having a claimed composition, in which a multiphase microstructure is generated during a continuous annealing, for the vehicle lightweight construction, said cold or hot rolled multiphase steel comprising (contents in weight %)

| | |
|---|---|
| C | 0.075 to ≤0.105 |
| Al | 0.005 to ≤0.060 |
| Si | 0.200 to ≤0.650 |
| Mn | 1.750 to ≤2.350 |
| P | ≤0.020 |
| S | ≤0.0050 |
| Cr | 0.200 to ≤0.500 |
| Mo | 0.200 to 0.500 |
| Ti | ≥0.005 to ≤0.060 |
| Nb | ≥0.005 to ≤0.060 |
| V | ≥0.005 to ≤0.060 |
| B | ≥0.0010 to ≤0.0060 |
| N | ≤0.0090 | remainder iron and inevitable impurities, wherein the sum of the contents of Ti, Nb, V, Mo and B-content is 0.22-0.50%, said method comprising;

heating the cold rolled or hot rolled steel strip in a continuous furnace to an annealing temperature in the range of 700 to 950° C.;

cooling the steel strip from the annealing temperature to a first intermediate temperature of 300 to 500° C. with a cooling rate of between 15 and 100° C./s;

and after the cooling to the first intermediate temperature treating the steel strip as set forth under a) or b):

a) cooling the steel strip to a second intermediate temperature of 200 to 250°C. with a cooling rate of between 15 and 100° C./s, and after the cooling to the second intermediate temperature cooling the steel strip in air until reaching room temperature with a cooling rate of 2 to 30° C./s;

b) maintaining the cooling of the steel strip from the first intermediate temperature to room temperature with a cooling rate between 15 and 100° C./s.

2. The method of claim 1, wherein the Mo-content is ≥0.250 to ≤0.450%.

3. The method of claim 1, wherein the Nb-content is ≥0.025 to ≤0.045%.

4. The method of claim 1, wherein the Ti-content is ≥0.025 to ≤0.045%.

5. The method of claim 1, wherein the V-content is ≥0.015 to ≤0.045%.

6. The method of claim 1, wherein the B-content is ≥0.0010 to ≤0.0050%.

7. The method of claim 1, wherein the N-content is ≤0.0070%.

8. The method according to claim 1, further comprising after the heating step and during the cooling to the first intermediate temperature step hot dip coating the steel strip in a hot dip bath, wherein the cooling to the first intermediate temperature is halted prior to entry into the hot dip bath and after the hot dip coating and cooling to the first intermediate temperature the steel strip is treated as set forth under a).

9. The method of claim 1, wherein the steel strip is treated as set forth under a), the method further comprising after the cooling of the steel strip to the second intermediate temperature and prior to the cooling of the steel strip in air until reaching room temperature with a cooling rate between 2 and 30° C./s, holding the second intermediate temperature for 1 to 20 s, reheating the steel strip to 420° C. to 470° C., and hot dip coating the steel strip in a hot dip bath.

10. The method of claim 1, further comprising skin passing the steel strip.

11. The method of claim 1, further comprising stretch leveling the steel strip.

* * * * *